US 8,484,685 B2
Jul. 9, 2013

(54) SYSTEM FOR PRESENTING MEDIA CONTENT

(75) Inventor: Scott White, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 476 days.

(21) Appl. No.: 11/837,769

(22) Filed: Aug. 13, 2007

(65) Prior Publication Data

US 2009/0049490 A1 Feb. 19, 2009

(51) Int. Cl.
*H04N 5/445* (2006.01)
*H04N 7/173* (2011.01)

(52) U.S. Cl.
USPC .............................. 725/58; 725/133; 725/61

(58) Field of Classification Search
USPC ........................ 725/112, 46, 41, 58, 61, 133
See application file for complete search history.

(56) References Cited

U.S. PATENT DOCUMENTS

| | | | |
|---|---|---|---|
| 6,177,931 B1 * | 1/2001 | Alexander et al. .............. 725/52 |
| 6,181,326 B1 | 1/2001 | Takahashi | |
| 6,437,836 B1 * | 8/2002 | Huang et al. .................. 348/734 |
| 6,446,261 B1 * | 9/2002 | Rosser ............................. 725/34 |
| 6,970,546 B2 * | 11/2005 | Kent et al. ................ 379/207.02 |
| 7,003,792 B1 * | 2/2006 | Yuen ................................ 725/46 |
| 7,065,184 B2 * | 6/2006 | Vishik et al. ............... 379/88.02 |
| 7,216,170 B2 * | 5/2007 | Ludvig et al. ................. 709/225 |
| 7,243,123 B1 * | 7/2007 | Allen et al. ................... 709/204 |
| 7,280,533 B2 * | 10/2007 | Khartabil et al. ............. 370/352 |
| 7,344,084 B2 * | 3/2008 | DaCosta .................. 235/472.01 |
| 7,454,775 B1 * | 11/2008 | Schaffer et al. ................. 725/46 |
| 2001/0049718 A1 | 12/2001 | Ozawa | |
| 2002/0010932 A1 | 1/2002 | Nguyen et al. | |
| 2003/0066085 A1 * | 4/2003 | Boyer et al. .................. 725/104 |
| 2003/0070167 A1 * | 4/2003 | Holtz et al. ..................... 725/32 |
| 2004/0049787 A1 * | 3/2004 | Maissel et al. .................. 725/46 |
| 2005/0010679 A1 * | 1/2005 | Yamaga et al. ............... 709/232 |
| 2005/0010953 A1 * | 1/2005 | Carney et al. ..................... 725/61 |
| 2005/0080864 A1 * | 4/2005 | Daniell ........................... 709/206 |
| 2005/0114141 A1 * | 5/2005 | Grody ........................... 704/270 |
| 2006/0105758 A1 * | 5/2006 | Maislos ......................... 455/420 |
| 2007/0042791 A1 * | 2/2007 | Walter ........................... 455/461 |
| 2007/0157228 A1 * | 7/2007 | Bayer et al. ..................... 725/34 |
| 2007/0220056 A1 * | 9/2007 | Arora ............................. 707/200 |
| 2008/0004021 A1 * | 1/2008 | Sanjay ........................... 455/436 |
| 2008/0046917 A1 * | 2/2008 | de Heer .......................... 725/32 |

* cited by examiner

*Primary Examiner* — James R Sheleheda

(74) *Attorney, Agent, or Firm* — Guntin & Gust, PLC; Andrew Gust (57) ABSTRACT

A system that incorporates teachings of the present disclosure may include, for example, a communication device having a controller element to receive a tout message associated with a media content item, and present the tout message with a selectable Internet link having one or more instructions for directing a set-top box (STB) receiver of a subscriber of the communication device. Other embodiments are disclosed.

18 Claims, 5 Drawing Sheets

SYSTEM FOR PRESENTING MEDIA CONTENT

FIELD OF THE DISCLOSURE

The present disclosure relates generally to media content and more specifically to a system for presenting media content.

BACKGROUND

It is common today for consumers of media content such as music and videos to receive advertisements via email or other communication means. These advertisements typically have Internet links such as a Uniform Resource Identifier (URL) to point the user to a website from which the media content being touted can be purchased. This approach however in some instances can be cumbersome to the consumers because it requires a number of steps to complete a transaction associated with the consumption of the advertised media content.

For instance, media content purchased from a media content portal generally must be downloaded to a computing device such as a desktop computer. In some cases, the consumer may desire presentation of the media content by way of a high fidelity media presentation device such as a set-top box (STB) with surround sound, high definition video, or like media instrumentation. To accomplish this, the consumer must transfer the purchased media to the STB from his/her computing device. By the time the consumer is able to playback the purchased media content at his/her STB, said consumer has undertaken a number of technical steps to reach this point. Similar complexities can arise in setting up media recordings of touted media content by way of a Digital Video Recorder (DVR).

Some consumers ignore messages with URL links to touted media content for lack of technical expertise or because they do not desire to spend the time to undergo steps similar to those described above.

DETAILED DESCRIPTION

In one embodiment of the present disclosure, a computer-readable storage medium can have computer instructions for selecting a media content item for a subscriber, constructing a tout message associated with the media content item, including in the tout message a selectable link comprising a Uniform Resource Locator (URL) with one or more instructions for directing a set-top box (STB) receiver of the subscriber, and transmitting the tout message to a communication device of the subscriber.

In one embodiment of the present disclosure, a communication device can have a controller element to receive a tout message associated with a media content item, and present the tout message with a selectable Internet link having one or more instructions for directing an STB receiver of a subscriber of the communication device.

In one embodiment of the present disclosure, a media content processor can have a controller element to receive one or more instructions for consuming a media content item, wherein the one or more instructions are included in each of one or more selectable Internet links of a tout message transmitted to a communication device of a subscriber of the media content processor.

Figure 1:
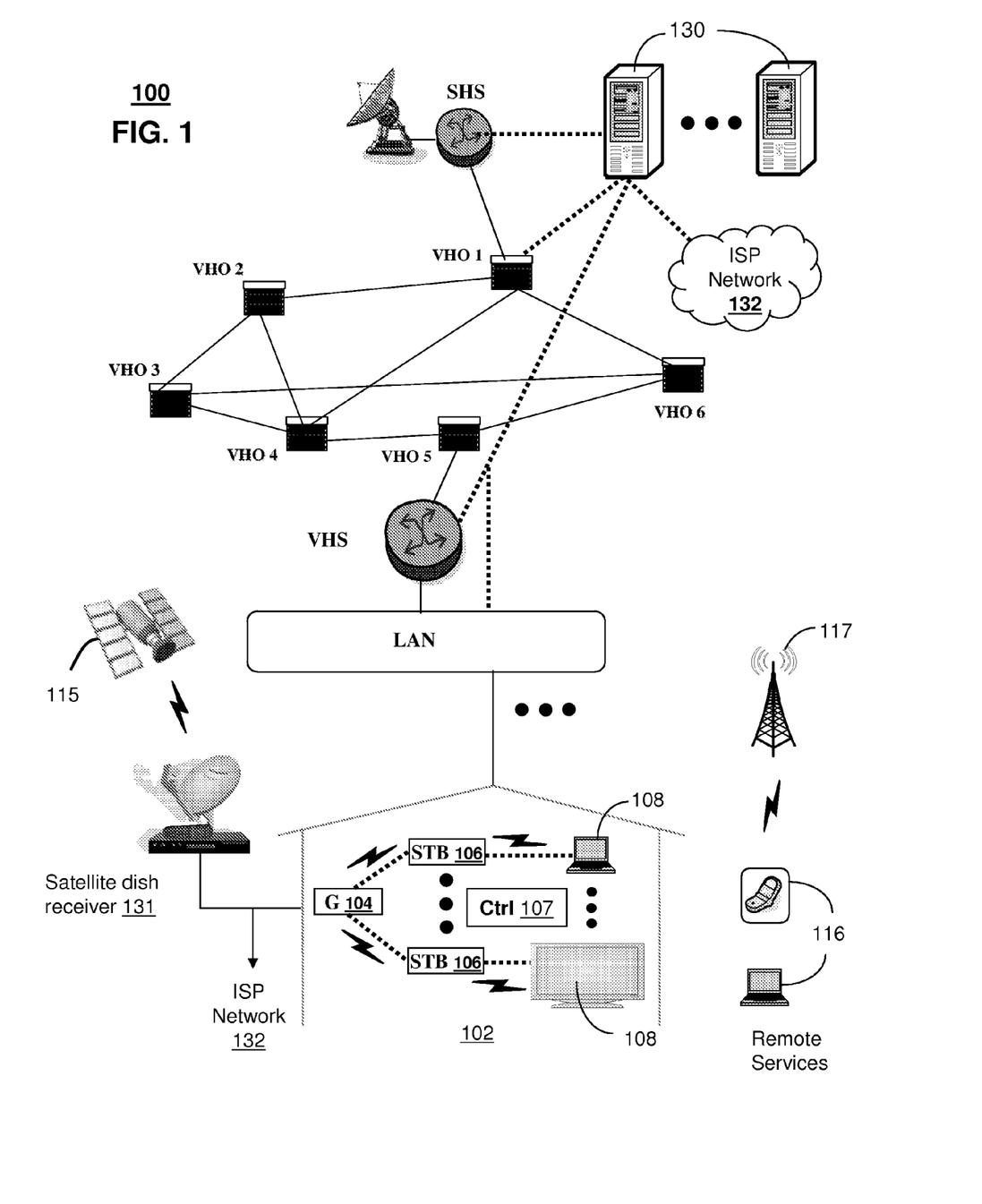
FIG. 1 depicts an exemplary embodiment of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. In the present context, media programs can represent audio only content, video only content, and/or combinations thereof. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 distributes broadcast signals to media content processors 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media content processors 106 and subsystems of the IPTV media system for services such as video-on-demand (VoD).

The IPTV media system can be coupled to one or more computing devices 130 that can operate as a web or Internet server for providing portal services over an Internet Service Provider (ISP) network 132 to fixed media devices 108 or portable communication devices 116 by way of a wireless base station 117 such as in a cellular communication network operating with common protocols (GSM, CDMA, etc.). The web server 130 can also operate as a tout manager for transmitting tout messages to communication devices of subscribers of communication system 100.

A satellite broadcast system can be used in place of the IPTV media system. In this embodiment, signals transmitted by a satellite 115 can be intercepted by a satellite dish receiver 131 coupled to building 102 which conveys media signals to the media content processors 106 by way of gateway 104. The media content processors 106 can be equipped with a broadband port to the ISP network 132. Although not shown, the communication system 100 can also be combined or replaced with analog or digital broadcast distributions systems such as cable systems. It would be apparent therefore to one of ordinary skill in the art that the present disclosure can be applied to any content media system.

Figure 2:
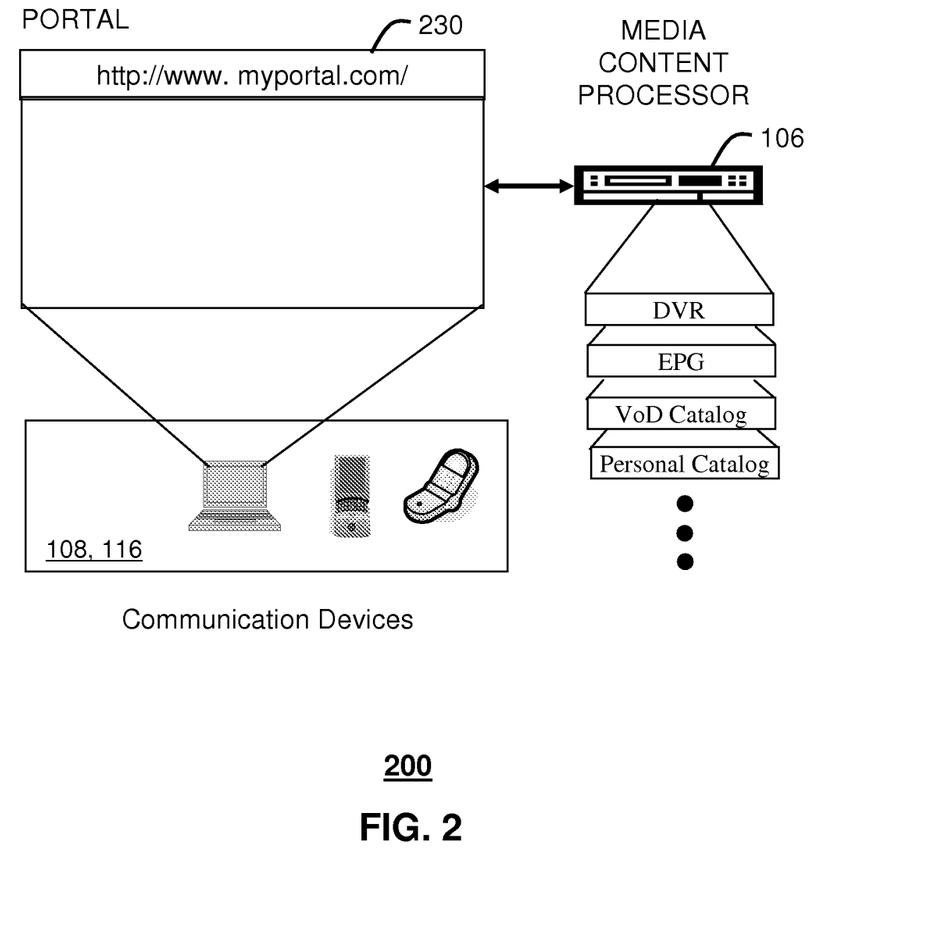
FIG. 2 depicts an exemplary embodiment of a portal of the communication system.

FIG. 2 depicts an exemplary embodiment of a portal 230 of the communication system 100. In FIG. 2, the portal 230 can be accessed by a URL with a common browser such as Microsoft's Internet Explorer using an Internet-capable fixed or portable communication device 108, 116. The portal 230 can be configured to access a media content processor 106 such as the STB of FIG. 1 and services managed thereby such as a Digital Video Recorder (DVR), an Electronic Programming Guide (EPG), Video on Demand (VoD) catalog, a personal catalog stored in the STB (e.g., personal videos, pictures, audio recordings, etc.), and so on by way of the gateway 104.

Figure 3:
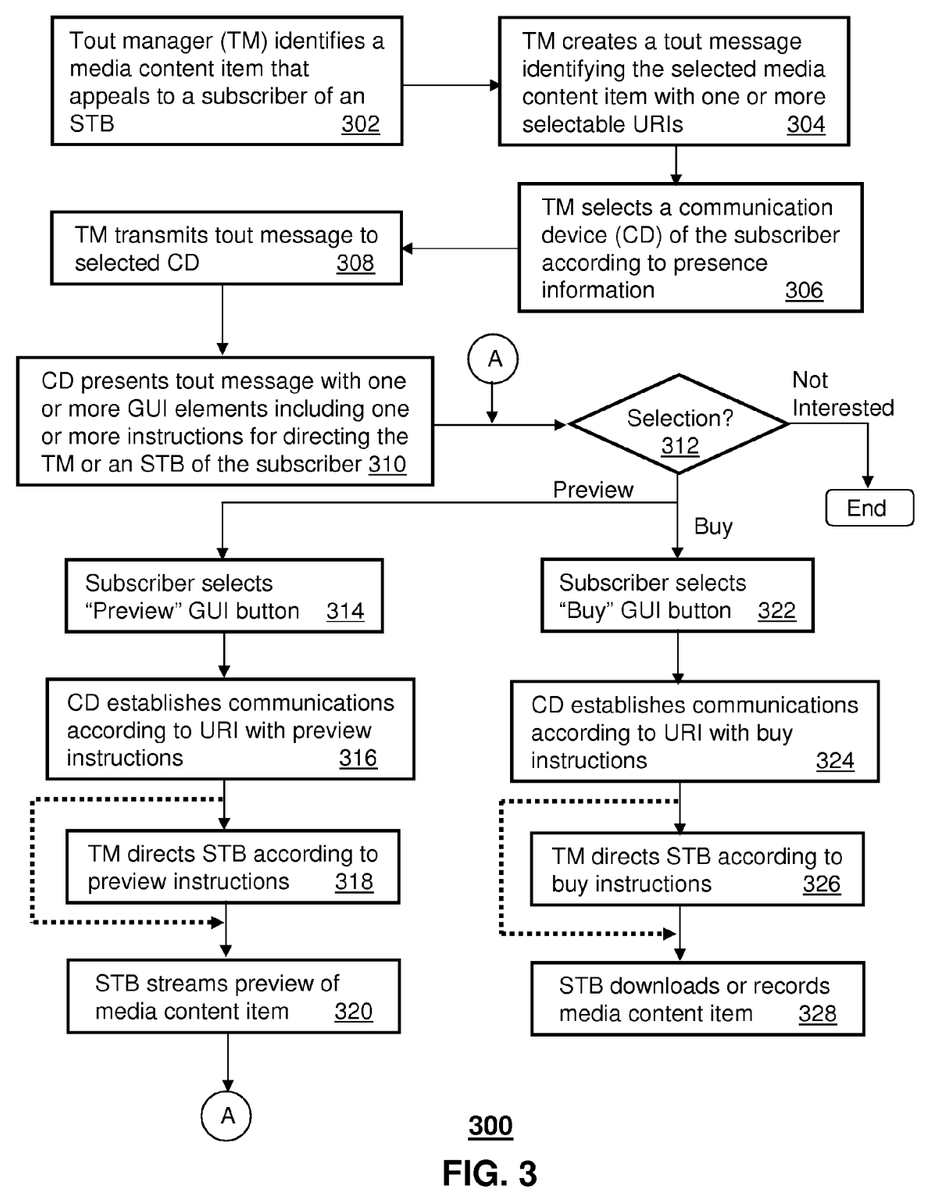
FIG. 3 depicts an exemplary method operating in portions of the communication system.

FIG. 3 depicts an exemplary method 300 operating in portions of the communication system 100. Method 300 begins with step 302 in which a tout manager identified herein by reference 130 identifies a media content item that appeals to a subscriber of an STB 106. The media content item can be identified according to one or more preferences of the subscriber and/or a history of media content consumed by the subscriber. The preferences can be established by the subscriber as settings by way of the portal 230. For example, the subscriber can identify music preferences (e.g., Classical music, artists, groups, etc.) and video preferences (e.g., comedies, action movies, ratings, actors, etc.). The tout manager 130 can also be programmed to monitor the STB 106 of a select subscriber for the content consumed by said subscriber. From a historical collection of monitored consumption, the tout manager 130 can utilize common pattern recognition techniques to identify likes and dislikes of the subscriber.

Based on proactive biases given by the subscriber (i.e., preferences) and/or observed behavior, the tout manager 130 can be programmed in step 302 to search for content that appeals to the subscriber. The tout manager 130 can search an EPG, a VoD catalog, pod casts, or the Internet in general for content that may be of interest to the subscriber. From metadata associated with media content found by the tout manager 130 in step 302, a tout message can be created in step 304 identifying the selected media content item (e.g., a new release of Matrix IV found in a VoD catalog) with one or more selectable Uniform Resource Identifiers (URIs). The URI can correspond to a Uniform Resource Identifier (URL) incorporating one or more instructions for directing the STB 106 of the subscriber on how to for example extract and process the media content item being touted. Alternatively, the URI can be represented by a Session Initiation Protocol (SIP) URI with similar instructions.

In step 306, the tout manager 130 can be programmed to select a communication device 108 or 116 of the subscriber according to presence information associated therewith. Computing devices 130 of FIG. 1 can also comprise a presence system which monitors by common means the activities and whereabouts of the subscriber. The presence server can for example detect that the subscriber is in transit with a portable communication device 116 by detecting a handover transition between base stations 117 and/or by receiving location coordinates from the portable communication device using a Global Positioning System (GPS) receiver incorporated therein. The presence system can also detect that the subscriber is utilizing a communication device 108 in building 102 based on network activity emanating from said communication device or being consumed thereby. With this information in hand, the touting manager 130 can select a communication device 108 or 116 having a predictable likelihood of reaching the subscriber.

Figure 4:
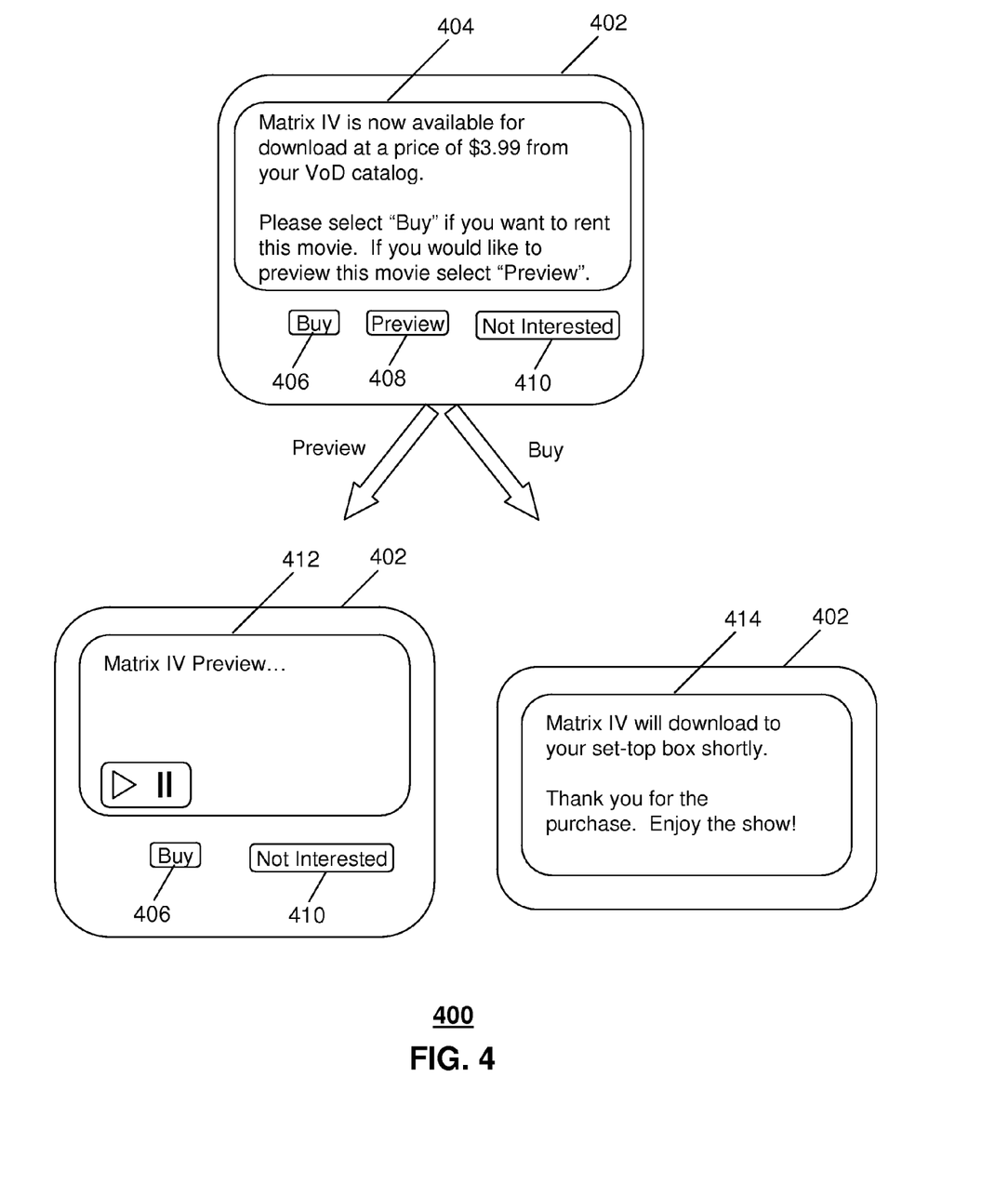
FIG. 4 depicts an exemplary embodiment of Graphical User Interface (GUI) windows presented by a communication device of the communication system according to the method of FIG. 3.

Once a communication device 108 or 116 is selected, the tout manager 130 transmits in step 308 the tout message to said device. The transmission can be a wireline or wireless transmission. Additionally, any communication medium can be used for said transmission such as for example a wireless multimedia messaging service (MMS) message, a message transmitted over a Rich Site Summary (RSS) feed, an email or other form of messaging technique suitable for the present disclosure. Upon receiving the tout message, the communication device 108 or 116 presents in step 310 the tout message with one or more GUI elements as shown in FIG. 4 and awaits a selection in step 312. In this illustration, the GUI elements can represent a GUI window 402 presented on a display of the communication device 108 or 116. A sub-GUI window 404 can present the tout message which could be a text-only message as shown or combined with graphical images (e.g., a movie or music banner).

In this example, the sub-GUI window indicates to the subscriber that the movie Matrix IV is now available for download from a VoD catalog or like source for a given price. The tout also provides an explanation of the actions that the subscriber can take: buy (or rent) the movie (GUI button 406), preview it (GUI button 408), or reject the tout (GUI button 410). Each of these GUI buttons can include a URI with one or more instructions that can be directed to the STB 106 of the subscriber and/or the tout manager 130.

If the subscriber selects by common means through a user interface (e.g., keypad, mouse, navigation disk, joy stick, etc.) of the communication device 108 or 116 to preview the touted media content in step 314, the communication device proceeds to step 316 where it establishes communications according to a URI of GUI button 408 with one or more preview instructions for directing the STB 106 or the tout manager 130. In the case where the URI is used to establish communications with the tout manager 130, the tout manager can decode the URI instructions to direct in step 318 the STB 106 to supply streamed media associated with the media content item identified by the tout message. This step can be the culmination of the STB 106 requesting a trailer of the media content item from a VoD catalog and streaming it in step 320 to the communication device 108 or 116 directly or to the tout manager 130 which redirects it to the communication device.

Alternatively, the URI can be used to establish communications with the STB 106 which processes the preview instructions in the URI. In this embodiment, the streamed media is transmitted by the STB 106 to the communication device 108 or 116 without assistance from the tout manager 130. In yet another embodiment, steps 318 and 320 can be supplanted with a step (not shown) in which the tout manager 130 retrieves the trailer from the VoD catalog and presents it to the communication device 108 or 116 as streamed content.

FIG. 4 depicts a transition when the preview button 408 is selected. In this illustration, a new GUI window 412 is presented by way of a user interface of the communication device 108 or 116. In said window 412 a trailer of the movie is streamed by the STB 106 or the tout manager 130 to the communication device 108 or 116 utilizing an embedded media player operating in a browser application of the communication device. GUI window 412 can have GUI elements such as play and pause buttons for controlling presentation of the movie trailer. The "Buy" GUI button 406 and the "Not Interested" GUI button 410 are presented with the preview GUI window 412 in the event the subscriber wants to purchase or reject the media content being touted. If the subscriber rejects the content, the communication device 108 or 116 can be programmed to terminate the GUI window 402 thereby ending method 300 from step 312.

If on the other hand the subscriber selects to purchase the media content in step 322 with or without previewing it, the communication device 108 or 116 proceeds to step 324 where it establishes communications according to the URI of the Buy GUI button 406 incorporating one or more buy instructions for directing the STB 106 or the tout manager 130. In one embodiment, the tout manager 130 can direct in step 326 the STB 106 to download in step 328 from a VoD catalog or other source the media content item identified by the tout message. Once the subscriber arrives in building 102, s/he can direct by way of the media controller 107 playback of the downloaded media content item. Alternatively, the communication device 108 or 116 can directly communicate the buy instructions to the STB 106 to download the media content item as described above.

Upon reviewing the aforementioned embodiments, it would be evident to an artisan with ordinary skill in the art that said embodiments can be modified, reduced, or enhanced without departing from the scope and spirit of the claims described below. For example, method 300 can be adapted so that the tout manager 130 can embed in the tout message an Internet link in the form of a URI with instructions for recording a proposed media content item. The presentation of the tout message can be much like that shown in FIG. 4 with the replacement of the Buy GUI button 406 with a Record GUI button. The Preview GUI button 408 can be kept if trailers can be retrieved from a backend system (not shown in FIG. 1). In yet another embodiment, the tout message can be nested so that multiple media content items can be promoted, and/or a media content selection or rejection leads to other tout messages with embedded URI links with associated instructions for the STB 106 to act on the proposed content.

These are but a few examples of modifications that can be applied to the present disclosure without departing from the scope of the claims. Accordingly, the reader is directed to the claims section for a fuller understanding of the breadth and scope of the present disclosure.

Figure 5:
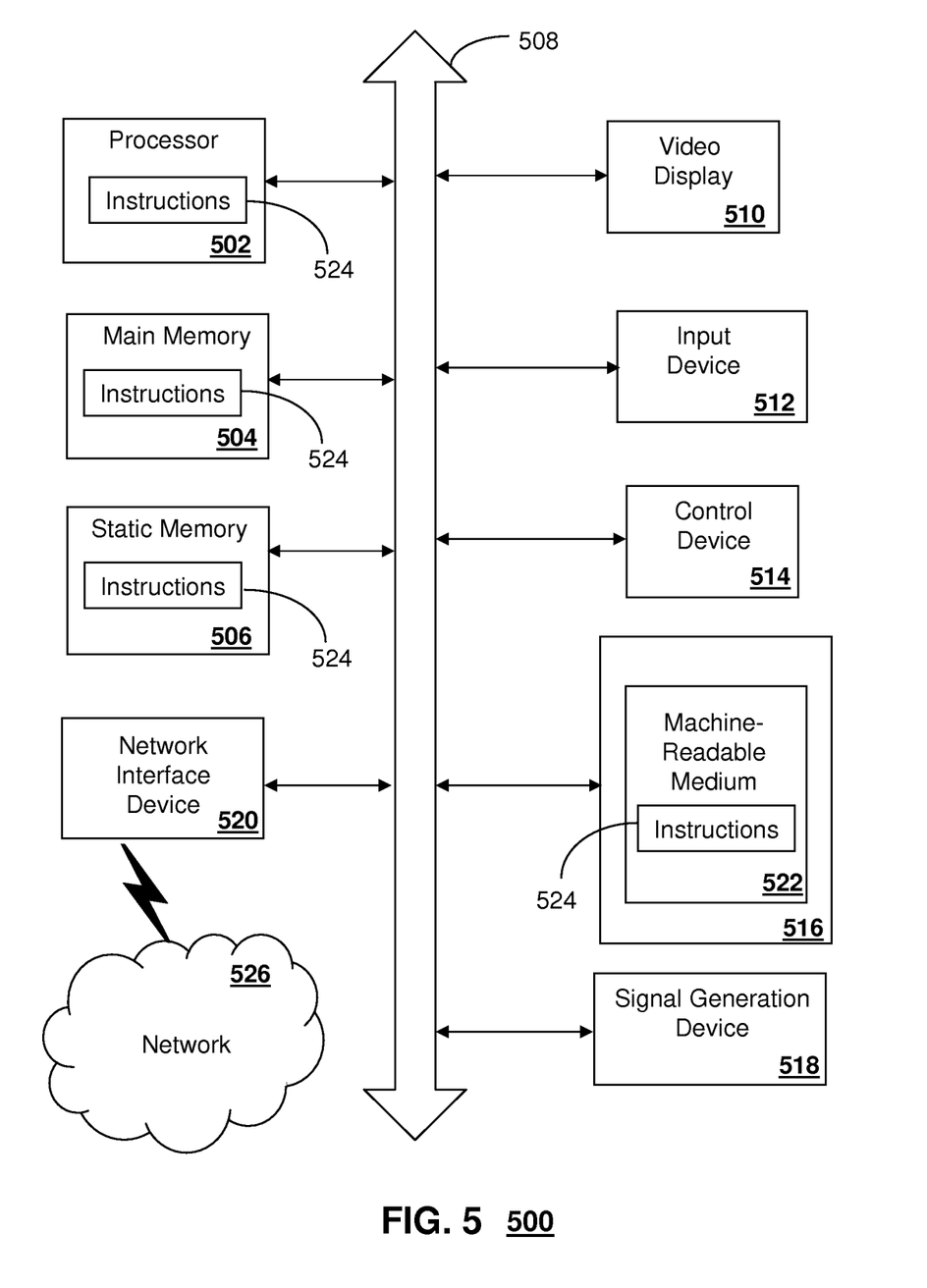
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which, responsive to being executed by a processor, cause the processer to perform operations comprising:

monitoring a set top box for consumption of media content by a subscriber;

selecting a media content item for the subscriber according to the consumption;

constructing a tout message associated with the media content item;

including in the tout message text associated with the media content item without providing images associated with the media content and further including in the tout message a selectable link comprising a Uniform Resource Locator with one or more instructions for directing the set top box of the subscriber to obtain the media content item without providing a preview of the media content item and without the subscriber providing additional input;

identifying a group of communication devices associated with the subscriber;

determining a prediction of a likelihood of reaching the subscriber based on presence information associated with the subscriber, wherein the presence information is determined from detecting a handover transition between base stations, from global positioning system coordinate information supplied by global positioning system receivers in the group of communication devices, and from network activity emanating from the group of communication devices;

selecting a mobile communication device of the subscriber from amongst the group of communication devices according to the prediction; and transmitting the tout message to the mobile communication device of the subscriber, wherein the tout message is transmitted using an email message, and wherein the mobile communication device receives the media content item via the set top box.

2. The non-transitory computer-readable storage medium of claim 1, wherein the media content item corresponds to video content, and wherein the transmitting of the tout message causes the mobile communication device to replace a buy button with a record button in a graphical user interface in which the tout message is presented.

3. The non-transitory computer-readable storage medium of claim 1, comprising computer instructions for selecting the media content item from a Video on Demand catalog.

4. The non-transitory computer-readable storage medium of claim 1, comprising computer instructions for selecting the media content item according to one or more preferences of the subscriber.

5. The non-transitory computer-readable storage medium of claim 1, comprising computer instructions for:

detecting a selection of the selectable link;

decoding the one or more instructions of the Uniform Resource Locator; and directing the set top box according to said one or more instructions.

6. The non-transitory computer-readable storage medium of claim 5, wherein the one or more instructions comprise one among a request to download to the set top box the media content item from a media catalog, and record at the set top box the media content item at a time, duration and media channel specified in the one or more instructions.

7. The non-transitory computer-readable storage medium of claim 1, wherein the selectable link establishes communications between the communication device of the subscriber and the set-top box when selected, and wherein the set-top box decodes the one or more instructions in the Uniform Resource Locator for directing the set-top box to perform one among downloading to the set top box the media content item from a media catalog, and recording at the set-top box the media content item at a time, duration and media channel specified in the one or more instructions.

8. A processor, comprising:

a memory to store computer instructions; and a controller element coupled with the memory, wherein the controller element, responsive to executing the computer instructions, performs operations comprising:

monitoring a set top box for consumption of media content by a subscriber;

selecting a media content item for the subscriber according to the consumption;

constructing a tout message associated with the media content item;
including in the tout message text associated with the media content item without providing images associated with the media content and further including in the tout message a selectable link comprising a Uniform Resource Locator with instructions for directing the set top box of the subscriber to obtain the media content item without providing a preview of the media content item and without the subscriber providing additional input;
identifying a group of communication devices associated with the subscriber;
determining a prediction of a likelihood of reaching the subscriber based on presence information associated with the subscriber, wherein the presence information is determined from detecting a handover transition between base stations, from global positioning system coordinate information supplied by global positioning system receivers in the group of communication devices, and from network activity emanating from the group of communication devices;
selecting a mobile communication device of the subscriber from amongst the group of communication devices according to the prediction; and
transmitting the tout message to the mobile communication device of the subscriber, wherein the tout message is transmitted using an email message, and wherein the mobile communication device receives the media content item via the set top box.

9. The processor of claim 8, wherein the the media content item is selected according to a history of media content consumed by the subscriber.

10. The processor of claim 8, wherein the media content item is selected according to preferences of the subscriber.

11. The processor of claim 10, wherein the instructions enable recording at the set-top box the media content item at a time, duration and media channel specified in the instructions.

12. The processor of claim 8, wherein the instructions enable downloading to the set top box the media content item from a media catalog.

13. A method comprising:
monitoring, by a system including a processor, a set top box for consumption of media content by a subscriber;
selecting, by the system, a media content item for the subscriber according to the consumption;
constructing a tout message associated with the media content item;
including in the tout message text associated with the media content item without providing images associated with the media content and further including in the tout message a selectable link comprising a Uniform Resource Locator with instructions for directing the set top box of the subscriber to obtain the media content item without providing a preview of the media content item and without the subscriber providing additional input;
identifying, by the system, a group of communication devices associated with the subscriber;
determining, by the system, a prediction of a likelihood of reaching the subscriber based on presence information associated with the subscriber, wherein the presence information is determined from detecting a handover transition between base stations, from global positioning system coordinate information supplied by global positioning system receivers in the group of communication devices, and from network activity emanating from the group of communication devices;
selecting, by the system, a mobile communication device of the subscriber from amongst the group of communication devices according to the prediction; and
transmitting, by the system, the tout message to the mobile communication device of the subscriber, wherein the tout message is transmitted using an email message, and wherein the mobile communication device receives the media content item via the set top box.

14. The method of claim 13, wherein the media content item corresponds to video content, and wherein the transmitting of the tout message causes the mobile communication device to replace a buy button with a record button in a graphical user interface in which the tout message is presented.

15. The method of claim 13, comprising selecting the media content item from a Video on Demand catalog.

16. The method of claim 13, comprising selecting the media content item according to preferences of the subscriber.

17. The method of claim 13, comprising:
detecting a selection of the selectable link;
decoding the one or more instructions of the Uniform Resource Locator; and
directing the set top box according to said one or more instructions.

18. The method of claim 13, wherein the selectable link establishes communications between the communication device of the subscriber and the set-top box when selected, and wherein the set-top box decodes the instructions in the Uniform Resource Locator for directing the set-top box to perform downloading to the set top box the media content item from a media catalog.

* * * * *